(12) United States Patent
Ayme-Perrot et al.

(10) Patent No.: US 8,778,230 B2
(45) Date of Patent: Jul. 15, 2014

(54) SULPHUR-MODIFIED MONOLITHIC POROUS CARBON-BASED MATERIAL, PROCESS FOR THE PREPARATION THEREOF AND USES THEREOF IN THE STORAGE AND RELEASE OF ENERGY

(75) Inventors: David Ayme-Perrot, Huningue (FR); Marie Dieudonné, Laguiole (FR); Philippe Sonntag, Hericy (FR); Anne-Caroline Pasquier, Bures sur Yvette (FR)

(73) Assignee: Hitchinson, Paris (FR)

( * ) Notice: Subject to any disclaimer, the term of this patent is extended or adjusted under 35 U.S.C. 154(b) by 174 days.

(21) Appl. No.: 13/294,513

(22) Filed: Nov. 11, 2011

(65) Prior Publication Data

US 2012/0156567 A1 Jun. 21, 2012

(30) Foreign Application Priority Data

Nov. 23, 2010 (FR) .................................. 10 04550

(51) Int. Cl.
*H01B 1/04* (2006.01)
*C01B 31/26* (2006.01)

(52) U.S. Cl.
USPC ........... 252/502; 252/503; 252/504; 252/505; 252/506; 423/414; 423/415.1; 423/443; 423/460; 429/231.8; 427/243

(58) Field of Classification Search
USPC ............... 252/502–508; 423/414, 415.1, 443, 423/460; 429/231.8; 427/243
See application file for complete search history.

(56) References Cited

U.S. PATENT DOCUMENTS

| 4,632,775 | A | 12/1986 | Kalnin et al. |
| 5,993,996 | A | 11/1999 | Firsich |
| 6,753,382 | B2 | 6/2004 | Kim et al. |
| 7,442,747 | B1 * | 10/2008 | Long et al. ..................... 525/505 |

FOREIGN PATENT DOCUMENTS

WO WO 2009/125094 A2 10/2009

OTHER PUBLICATIONS

Baker, W. S. et al., *Sulfur-functionalized carbon aerogels: a new approach for loading high-surface-area electrode nanoarchitectures with previous metal catalysts*, Journal of Non-Crystalline Solids 350 (2004) 80-87.
Calahorro, C. V. et al., *Study of Sulfur Introduction in Activated Carbon*, Carbon vol. 28, No. 2-3 (1990) 321-335.
Lakshmi, N. et al., *Functionalization of various carbons for proton exchange membrane fuel cell electrodes: analysis and characterization*, Journal of Physics D: Applied Physics 39 (2006) 2785-2790.
Preliminary Search Report for French Application No. 1004550 dated Jul. 11, 2011.
Colloid and Polymer Science, vol. 253 (1975), pp. 538-554.
Brunauer, S. et al., J. Am. Chem. Soc., 50 (1938), 309.

(Continued)

*Primary Examiner* — Harold Pyon
*Assistant Examiner* — Katie L Hammer
(74) *Attorney, Agent, or Firm* — Alston & Bird LLP

(57) ABSTRACT

A subject-matter of the invention is a novel process for the preparation of sulphur-modified monolithic porous carbon-based materials by impregnation with a strong sulphur-based acid, the materials capable of being obtained according to this process and the use of these materials with improved supercapacitance properties to produce electrodes intended for energy storage systems. Electrodes composed of sulphur-modified monolithic porous carbon-based materials according to the invention and lithium batteries and supercapacitors having such electrodes also form part of the invention.

9 Claims, 3 Drawing Sheets

(56) References Cited

OTHER PUBLICATIONS

Conway, B. E., Electrochemical Supercapacitors—Scientific Fundamentals and Technological Applications, pp. 186-190.
Figueiredo, J. L., Carbon, 37 (1999), 1379.
Hsieh, C. T., Carbon, 40 (2002), 667.
Lin, C. et al., Carbon, 35 (1997), 1271.
Lin, C. et al., Carbon, 38 (2000), 849.
Mathieu, B. et al., Ann. Chim. Fr., 22 (1997), 19.
Miller, J. R. et al., Electric vehicle capacitor test procedure manual, DOE/ID10491 (1994), pp. 21-25.
Pekala, R. W. et al., J. Mater. Sci., 24 (1989), 3221.
Zhang, B. et al., Electrochimica Acta, 54 (2009), 3708-3713.
Brunauer, S. et al., *Adsorption of Gases in Multimolecular Layers*, J. Am. Chem. Soc., 50 (1938), 309-319.
Conway, B. E., Electrochemical Supercapacitors—Scientific Fundamentals and Technological Applications, pp. 186-190.
Figueiredo, J. L., *Modification of the Surface Chemistry of Activated Carbons*, Carbon, 37 (1999), 1379-1389.
Hsieh, C. T., *Influence of Oxygen Treatment on Electric Double-Layer Capacitance of Activated Carbon Fabrics*, Carbon, 40 (2002), 667-674.
Lin, C. et al., *Carbonization and Activation of sol-gel Derived Carbon Xerogels*, Carbon, 38 (2000), 849-861.
Lin, C. et al., *Effect of synthesis ph on the Structure of Carbon Xerogels*, Carbon, 35 (1997), 1271-1278.
Mathieu, B. et al., *Synthesis of Resorcinol-formaldehyde Aerogels by the Freeze-Drying Method*, Ann. Chim. Fr., 22 (1997), 19-29.
Miller, J. R. et al., Electric Vehicle Capacitor Test Procedure Manual, Rev. 0, DOE/ID10491 (1994), pp. 21-25.
Ono, H. et al., *Studis on the Stability of Styrene-Acrylonitrile Copolymer Latex Dispersions*, Colloid and Polymer Science, vol. 253 (1975), pp. 538-543.
Pekala, R. W. et al., *Organic Aerogels from the Polycondensation of Resorcinol With formaldehyde*, J. Mater. Sci., 24 (1989), 3221-3227.
Zhang, B. et al., *Preparation and Electrochemical Properties of sulfur-Acetylene Black Composites as Cathode Materials*, Electrochimica Acta, 54 (2009), 3708-3713.

\* cited by examiner

SULPHUR-MODIFIED MONOLITHIC POROUS CARBON-BASED MATERIAL, PROCESS FOR THE PREPARATION THEREOF AND USES THEREOF IN THE STORAGE AND RELEASE OF ENERGY

FIELD OF THE INVENTION

A subject-matter of the invention is a novel process for the preparation of sulphur-modified monolithic porous carbon-based materials, the materials capable of being obtained according to this process, said materials exhibiting optimized supercapacitance properties, and the use of these materials to produce electrodes intended for energy storage systems. The present invention also relates to electrodes composed of sulphur-modified monolithic porous carbon-based materials according to the invention and to lithium batteries and supercapacitors, also known as electrochemical capacitors, comprising such electrodes.

BACKGROUND

Supercapacitors generally consist of the combination of two conductive electrodes having a high specific surface, immersed in an ionic electrolyte and separated by an insulating membrane, referred to as "separator", which makes possible ionic conductivity and prevents electrical contact between the electrodes. Each electrode is in contact with a metal collector which makes possible exchange of the electric current with an external system. Under the influence of a difference in potential applied between the two electrodes, the ions present within an electrolyte are attracted by the surface exhibiting an opposite charge, thus forming an electrochemical double layer at the interface of each electrode. Electrical energy is thus stored electrostatically by separation of the charges.

The expression of the capacitance of such supercapacitors is identical to that of conventional electrical capacitors, namely:

$$C = \epsilon \cdot S/t$$

with: $\epsilon$: the permittivity of the medium,
S: the surface area occupied by the double layer, and
t: the thickness of the double layer.

The capacitances achievable within supercapacitors are much greater than those commonly achieved by conventional capacitors, this being as a result of the use of porous electrodes having a high specific surface (maximization of the surface area) and of the extreme narrowness of the electrochemical double layer (a few manometers).

Moreover, the energy stored within the capacitor is defined according to the following expression:

$$E = \frac{1}{2} \cdot C \cdot V^2,$$

in which V is the potential of the supercapacitance.

The capacitance and the potential are two essential parameters which it is necessary to optimize in order to promote the performances of the supercapacitors, the potential depending directly on the stability of the electrolyte under the influence of the electric field.

Thus, the electrodes used must necessarily be:
conducting, in order to provide for the transportation of the electric charges,
porous, in order to provide for the transportation of the ionic charges and the formation of the electrical double layer over a large surface area, and
chemically inert, in order to prevent any energy-consuming side reactions.

Energy storage systems are thus particularly advantageous for applications requiring high powers while conveying significant energies. The possibilities of rapid charges and discharges, the increased lifetime with respect to a battery and the possibility of having systems based on non-toxic products make supercapacitors promising candidates for many applications.

Porous carbon-based materials, in the powder or monolith form, appear to be best suited to such applications. Among the porous carbon-based materials described in the prior art, carbon aerogels exhibit advantageous characteristics for supercapacitance applications due to their high porosity (R. W. Pekala et al., J. Mater. Sci., 24 (1989), 3221; C. Lin et al., Carbon, 35 (1997), 1271; B. Mathieu et al., Ann. Chim. Fr., 22 (1997), 19).

The specific surface of the carbon-based materials and the porosity actually accessible by the electrolyte are essential factors in the establishment and optimization of the electrochemical double layer. The resulting capacitance is commonly expressed with respect to the dry weight of the material. The term used is "specific capacitance", expressed in F/g of dry carbon. Nevertheless, this method of calculation is not satisfactory insofar as it is not representative of the performances of the material when it is employed as electrode. A better balance between the quantitative numerical evaluation and the reality of the performance can be obtained by evaluation of the full capacitance by weight of the material, which takes into account the pore volume of this material. Maximizing the performance of the carbon-based electrodes ideally requires managing to increase this capacitance, which is a function of the accessible surface area, while reducing the pore volume of the materials. This is because this volume is occupied by the electrolyte (which increases the final weight of the electrodes), which lowers the full capacitance by weight (expressed in F/g of carbon filled with electrolyte). On considering that the two electrodes of the same system have the same specific capacitance, reference is made to "mean specific capacitance".

WO 2009/125094 describes carbon-based materials resulting from the pyrolysis of resorcinol/formaldehyde latex (RFL) type, these materials exhibiting an adjusted porosity. However, the mean capacitances of these materials can still be improved.

Various chemical treatments which make it possible to enhance the capacitance performance of carbon-based materials have thus been described in the literature. They typically involve activation using $CO_2$, $HNO_3$, $H_2O_2$ or KOH (J. L. Figueiredo, Carbon, 37 (1999), 1379). In the majority of cases, these treatments consist in creating additional porosity by the local destruction of the carbon (C. Lin et al., Carbon, 38 (2000), 849). The disadvantage of this approach is the simultaneous increase in the capacitance and in the pore volume. The increase in the full specific capacitance (expressed in F/g of carbon filled with electrolyte) is thus not systematic since the weight of the material increases in parallel with the capacitance.

In addition, the activation treatment results in oxidation of the surface of the carbons, resulting in more or less significant grafting of oxygen-based functional groups exhibiting a redox activity (B. E. Conway, Electrochemical Supercapacitors—Scientific Fundamentals and Technological Applications, pp. 186-190). As the phenomena generated are faradaic and occur at the surface, they are fast and comparable to a capacitance contribution (reference is made to pseudocapacitance).

The presence of oxygen-based functional groups can also affect the wettability, indeed even the chemical and electrochemical reactivity, at the electrode/electrolyte interface and can thus promote the establishment of the electrochemical double layer (C. T. Hsieh, Carbon, 40 (2002), 667). However, the pseudocapacitance of such grafted materials still remains to be improved.

U.S. Pat. No. 5,993,996 relates to energy storage devices. This document describes a process for the treatment of porous carbon-based materials resulting from phenolic resins, the said process comprising a hydrogenation stage at a temperature of between 650 and 900° C. (this is a reduction stage intended to eliminate the oxygen-based functional groups at the surface of the carbon-based material), followed by a sulphonation stage carried out using a concentrated sulphuric acid solution at a temperature which can reach 290° C. Nevertheless, this process remains complex insofar as it necessarily comprises a preliminary hydrogenation stage.

Other documents of the prior art provide processes for grafting and for maximizing the contents of sulphur within porous carbon-based materials.

Baker et al. (W. S. Baker et al., J. Non-Cryst. Solids, 350 (2004), 80-87) describe in particular the modification of carbon-based surfaces by reacting resorcinol/formaldehyde (RF) gels with 3-thiophenecarboxaldehyde, the latter being inserted within the network after gelling the RF system. Thiophene groups are thus incorporated in the structure of the gel and result, after pyrolysis, in the appearance of residual sulphur-based functionalities. The major disadvantages of the materials resulting therefrom are their very low densities and capacitances by volume. Moreover, this process involves numerous stages and requires a very long implementation time (several days).

Zhang et al. (B. Zhang et al., Electrochimica Acta, 54 (2009), 3708-3713) describe the preparation of sulphur-based carbon-based materials obtained by heat treatment of mixtures of acetylene black and sulphur. This technique makes it possible to obtain graphitic carbon-based materials comprising a significant amount of sulphur (36% by weight). These materials (as a mixture with a binder of PTFE type) are used as cathodes in faradaic systems, i.e. Li—S batteries. In such systems, the diffusion of the entities is slow (limited overall kinetics of the electrode), which does not render them suitable for supercapacitance applications.

Valenzuela Calahorro et al. (C. Valenzuela Calahorro et al., Carbon, Vol. 28, Nos. 2/3, pp. 321-335, 1990) describe the introduction of sulphur into activated carbon-based materials using the gaseous agents $H_2S$ and $SO_2$, according to different heating conditions. However, industrial processes based on the uses of such gases are toxic and remain complex to implement.

Lakshmi et al. (N. Lakshmi et al., J. Phys. D: Appl. Phys., 39 (2006), 2785-2790) describe carbon-based materials in the powder form intended to be used in fuel cells, the carbon-based materials being subjected to a treatment with ammonium sulphate at a temperature of 235° C., thus generating sulphur trioxide $SO_3$. The latter subsequently reacts with the hydrogens located at the surface of the materials:

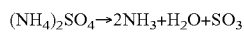

$(NH_4)_2SO_4 \rightarrow 2NH_3 + H_2O + SO_3$

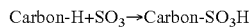

Carbon-H+$SO_3$→Carbon-$SO_3$H

The RF or RFL materials treated with ammonium sulphate $(NH_4)_2SO_4$ nevertheless exhibit very low capacitances.

SUMMARY

However, contrary to the solutions of the prior art, the present invention provides a novel process which makes it possible to obtain monolithic porous carbon-based materials having optimized supercapacitance properties as a result of the presence of a controlled content of sulphur at the surface thereof, these materials being obtained by bringing into contact with a strong sulphur-based acid, followed by a specific heat treatment stage.

One of the objectives of the present invention consists in developing a process for the preparation of a sulphur-modified porous carbon-based material, the materials obtained according to this process exhibiting markedly improved energy performances in comparison with the materials of the prior art, this being achieved by optimizing the amount of sulphur present within the said materials. This is because the inventors have demonstrated that the process of the invention makes it possible to maximize the energy performances and more particularly the capacitance and the energy efficiency of the materials resulting therefrom.

In addition, a large part of the carbon-based materials of the prior art exhibit a limited mechanical strength which does not allow them to be machined. In order to produce electrodes from such materials, it is necessary first of all to reduce them to a powder, which is subsequently compressed as a mixture with a binder, generally a fluoropolymer. As the binder is a non-conductive material, the capacitance by weight of such electrodes is limited and less than that of the carbon-based material itself, if it were in the form of a monolith.

The inventors have thus sought to develop a material which simultaneously has a high density and thus a high mechanical strength and which also has an improved capacitance. The invention relates in particular to a machinable monolithic carbon-based material.

The inventors have also looked for products and processes which are economical, simple to carry out and applicable on the industrial scale. Specifically, contrary to certain processes of the prior art, the process of the invention exhibits the advantage of not requiring a preliminary hydrogenation stage.

Thus, a first subject-matter of the invention is a process for the preparation of a sulphur-modified monolithic porous carbon-based material exhibiting enhanced supercapacitance properties, the said process comprising at least the following stages:

(i) the drying of a gel comprising at least one hydrophilic polymer of polyhydroxybenzene/formaldehyde type, (ii) the pyrolysis of the material obtained during stage (i), (iii) the impregnation of the monolithic carbon-based material resulting from stage (ii) with a strong sulphur-based acid, (iv) the heat treatment at a temperature of between 300 and 500° C., preferably between 350 and 500° C., and more preferably still between 300 and 400° C., of the sulphur-modified material obtained at the end of stage (iii), the said process not comprising a hydrogenation stage.

The term "gel" is understood to mean the mixture of a colloidal material and of a liquid which is formed, spontaneously or under the action of a catalyst, by the flocculation and the coagulation of a colloidal solution.

The hydrophilic polymers of polyhydroxybenzene/formaldehyde (RF) type used are polymers resulting from the polycondensation of at least one monomer of the polyhydroxybenzene type and of at least one formaldehyde monomer, it being possible for this polymerization reaction to involve more than two distinct monomers, the additional monomers being or not being of the polyhydroxybenzene type.

The polyhydroxybenzenes used in the context of the present invention are preferably di- or trihydroxybenzenes and advantageously resorcinol (1,3-dihydroxybenzene) or a mixture of resorcinol with another compound chosen from catechol, hydroquinone or phloroglucinol.

The polymer system, preferably a resorcinol/formaldehyde system, can in addition be mixed with a latex.

The term "latex" is understood to mean an aqueous dispersion of an elastomer. Advantageously, according to the invention, use is made of a latex with a pH of between 3 and 7.5 and advantageously between 5.5 and 7.5.

Preferably, the latex is a nitrogen-based latex, that is to say a latex carrying nitrogen-based functional groups, such as nitrile, azo, amine or amide functional groups.

The nitrogen-based latex of the invention is preferably characterized by an amount of nitrogen-based monomers representing between 0.1 and 95 mol %, with respect to the combined monomers of the latex. These amounts are evaluated with regard to the active material, the water in which the latex is dispersed being excluded.

According to the invention, the latex can be a mixture of at least two latexes, a nitrogen-based latex and a non-nitrogen-based latex. Advantageously, the nitrogen-based latex represents from 5 to 100% of the weight of latexes.

Mention may be made, among the nitrogen-based latexes which can be used, of: nitrile rubbers, copolymers of acrylonitrile and butadiene (NBRs), hydrogenated copolymers of acrylonitrile and butadiene (HNBRs), copolymers of styrene and acrylonitrile (SANs), terpolymers of acrylonitrile, butadiene and styrene (ABSs), terpolymers of styrene, acrylonitrile and styrene (SASs) or polyurethane elastomers. These polymers can be in the latex form or optionally in the form of a suspension of particles or fibres. They may or may not be partially precrosslinked and may even be in the form of microgels.

Such products are available commercially under the following references: Nipol®, Lipolan® and Perbunan-N®. The products hydrogenated NBRs (HNBRs), carboxylated NBRs (XNBRs) and HXNBRs are manufactured by Polymer Latex, Lanxess, Sumitomo and Nippon Zeon.

The styrene/acrylonitrile (SAN) latexes are described in Colloid and Polymer Science (1975), vol. 253, pp. 538-54, and SAN Butadiene Styrene core/shell latexes are described in U.S. Pat. No. 6,753,382.

In the gel of the invention, the molar ratio of polyhydroxybenzene, denoted R and which is preferably resorcinol, to formaldehyde, denoted F, is $0.4 \leq R/F \leq 0.6$, preferably $0.45 \leq R/F \leq 0.55$. Advantageously: $R/F \approx 0.5$.

The ratio by weight of the latex particles ($W_L$) to the sum of all the constituents $W_L + W_R + W_F$, with $W_R$=weight of polyhydroxybenzene (preferably resorcinol) and $W_F$=weight of formaldehyde, is within the following limits:

$$0.1 \leq \frac{W_L}{W_L + W_R + W_F} \leq 95\%,$$

preferably, this ratio is between 1 and 40%, more preferably between 1 and 30% and more preferably still between 2 and 15%, so as to promote the increase in density of the product and thus the mechanical strength thereof.

In this calculation, the weight of the particles of the latex $W_L$ is evaluated without solvent. The weight of the latex particles is calculated by deducting the weight of water from the total weight of the latex dispersion.

The stage (i) of drying of the gel comprising at least one hydrophilic polymer of polyhydroxybenzene/formaldehyde type is preferably carried out at constant volume, advantageously under pressure, in an oven, at a temperature ranging from 70 to 90° C., for a period of time of between 12 and 72 hours. On the industrial scale, the drying stage can be carried out under a controlled atmosphere.

Various drying methods can be envisaged: either by exchange of solvents and then drying in a supercritical $CO_2$ medium, or by convective drying under a gas stream or in a climate-controlled chamber at a controlled degree of humidity, or by lyophilization.

Preferably, the choice is made to apply drying by exchange of solvents and then drying in a supercritical $CO_2$ medium, or convective drying in a climate-controlled chamber at a controlled degree of humidity, these two drying methods making it possible to obtain products without deformation or cracks. Convective drying is the most preferred, insofar as it is the cheapest drying method.

The dried gels obtained on conclusion of stage (i) are subsequently pyrolyzed during a stage (ii).

Stage (ii) is advantageously carried out under a nitrogen atmosphere according to the following protocol:

a slow rise in temperature, preferably at a rate of between 1 and 5° C./min, up to a temperature of 400-500° C., it being possible for this temperature to be maintained for an approximate period of time of one hour, this rise in temperature making it possible to improve the mechanical strength of the material, followed by a faster rise in temperature, preferably at a rate of between 5 and 20° C./min, up to a temperature of 800-1500° C., it being possible for this temperature to be maintained for an approximate period of time of two hours.

Stage (ii) of the process of the invention results in a carbonization of all the components present in the material, the latter undergoing a reduction in volume. The material exists in the form of a monolith of high mechanical strength, which allows it to be machined. However, according to an alternative form of the invention, the said carbon-based material can, if desired, be reduced to a powder.

Stage (iii) of the process of the invention is a post-treatment stage which consists in bringing the carbon-based material obtained during stage (ii) into contact with a strong sulphur-based acid.

The term "strong sulphur-based acid" is understood to mean an acid based on sulphur which has a pH<1. According to an advantageous embodiment, the strong sulphur-based acid is provided in the solution form. It can be chosen from sulphuric acid, oleum, chlorosulphonic acid and fluorosulphonic acid, the most preferred strong sulphur-based acid being sulphuric acid. The strong sulphur-based acid used is preferably employed in the solution form at a concentration of between 0.5M and saturation and preferably between 1M and saturation.

According to a preferred embodiment, stage (iii) is carried out by immersion in a solution of strong sulphur-based acid for a period of time of between 1 hour and 24 hours.

The material obtained on conclusion of stage (iii) of the process of the invention is subsequently subjected to a stage (iv) of heat treatment, the said heat treatment preferably being carried out under a stream of nitrogen (flow rate ranging from 0.1 to 1 l·min$^{-1}$), at a rate of between 1 and 20° C./min, up to a plateau which can vary from 300 to 500° C. and preferably from 300 to 400° C., for a period of time which can be between 1 minute and 12 hours, and preferably less than or equal to 2 hours. The diffusion of the gases resulting from the decomposition of the strong sulphur-based acid within the material can thus be controlled by varying the rate, the temperature and/or the duration of the heat treatment.

During the heat treatment, the sulphuric acid decomposes to give sulphur trioxide (the reaction is virtually complete at 450° C.). Depending on the functional groups present at the surface of the carbon-based material, the following reactions may in particular take place:

carbon-H+SO$_3$→carbon-SO$_3$H (sulphonation)

R—OH+H$_2$SO$_4$→R—O—SO$_3$H+H$_2$O

The sulphur trioxide released is thus diffused through all the pores of the material.

Another subject-matter of the invention is a sulphur-modified porous carbon-based material capable of being obtained according to the process of the invention, the said material comprising a surface atomic percentage of sulphur varying from 0.01 to 0.5%, and exhibiting a density ranging from 0.5 to 1.3 and preferably from 0.7 to 1.3. Advantageously, the surface atomic percentage of sulphur varies from 0.1 to 0.5%, and the density from 0.75 to 1.1. Optimization of these characteristics and particularly of the density is essential in order to allow the storage of energy in the smallest possible volume and thus to meet volume constraints, while having a satisfactory mechanical strength.

The carbon-based material of the invention is characterized in addition by a pore volume (measured by the BET or dry impregnation method) which can vary from 0.4 to 1 cm$^3$·g$^{-1}$, and more preferably still from 0.4 to 0.75 cm$^3$·g$^{-1}$.

The carbon-based material of the invention is a carbon monolith. The term "carbon monolith" is understood to mean a material formed of a single block composed essentially of carbon atoms. The carbon-based material of the invention can nevertheless exhibit a surface concentration of oxygen atoms ranging from 16 to 23% and of nitrogen atoms ranging from 0 to 1%.

Porous materials are characterized by the size of the pores which they comprise.

Materials having pores with diameters of less than 2 nm are described as microporous. Those having pores with diameters of between 2 and 50 nm are described as mesoporous. Finally, materials having pores with a diameter of greater than 50 nm are described as macroporous.

Advantageously, the carbon-based material of the invention exhibits a network of pores, at least 10% of which is mesoporous (having a pore size with a diameter of between 2 and 50 nm) and preferably more than 20%.

According to an advantageous embodiment, the carbon-based material of the invention exhibits a specific surface, measured according to the BET method, of greater than or equal to 500 m$^2$·g$^{-1}$.

The material of the invention is also characterized by a mean full capacitance by weight (filled with electrolyte) preferably of greater than or equal to 140 F/g, measured in a 1M aqueous H$_2$SO$_4$ solution, or of greater than or equal to 120 F/g, measured in a 6M aqueous KOH solution.

The mean full capacitance by weight is the mean capacitance by weight of the material measured on the material filled with electrolyte. It is measured after immersion of the material in a solution of electrolyte. It varies according to the electrolyte used and in particular it depends on the density of the electrolyte.

The use of a sulphur-modified monolithic porous carbon-based material as defined according to the invention to produce electrodes intended for supercapacitance energy storage systems also forms part of the invention.

Finally, the invention also relates to electrodes composed of a sulphur-modified porous carbon-based material according to the invention for lithium batteries comprising at least one electrode according to the invention.

The electrodes of the invention can also be prepared by reducing the materials of the invention to a powder and by then compressing them as a mixture with a binder, generally a fluoropolymer. This additional stage can be carried out before or after the stage (iii) of post-treatment of the carbon-based material with a strong sulphur-based acid.

BRIEF DESCRIPTION OF THE DRAWINGS

In addition to the preceding provisions, the invention also comprises other provisions which will emerge from the remainder of the description which follows, which relates to examples demonstrating the advantageous properties of the carbon-based materials obtained according to the process of the invention, and to the appended figures, in which.

DETAILED DESCRIPTION

Experimental Part

EXAMPLE 1

I—Synthetic Protocol

The gels result from a polycondensation of resorcinol with formaldehyde in the presence of particles of latex, an NBR elastomer.

The resorcinol/formaldehyde (R/F) and resorcinol/catalyst (R/C) molar ratios and the resorcinol/water (R/W) ratio by weight were set at 0.5, 600 and 0.4 respectively.

The formaldehyde employed is in the form of an aqueous solution (stabilized in the presence of from 10 to 15% of methanol) and the amount of water present in it is taken into account in the total volume of water present in the formulation and thus in the R/W ratio.

The resorcinol (10.204 g, supplied by Acros, 98% grade) is first dissolved in distilled water. The aqueous formaldehyde solution (Riedel de Haan, as a 36.5% solution) is subsequently added: 14.944 g.

The content of latex particles (Latex Perbunan® RN-2890) added to the system is defined according to the ratio:

$$\frac{w_L}{w_L + w_R + w_F}$$

This calculated weight represents the weight of latex particles and not the overall weight of latex solution. The content of latex present in the gel is 5%.

The final mixture is poured into airtight chambers, which are placed in an oven at 90° C. for 1 day. The gels obtained are washed by immersing them in distilled water for 2 hours, so as to remove the traces of reactants still present.

The gels are subsequently placed in a climate-controlled chamber at 85° C. exhibiting a degree of humidity of 85%.

The dried gels are subsequently pyrolyzed under a stream of nitrogen of 0.15 l·min$^{-1}$ according to the following protocol:

a rise in temperature at 5° C./min up to a temperature of 400° C., this temperature being maintained for a period of time of one hour, then a rise in temperature at 5° C./min up to a temperature of 800° C., this temperature being maintained for a period of time of two hours, the gels subsequently being brought back to ambient temperature.

The carbon-based material thus obtained is placed in an 18M sulphuric acid solution, subjected to treatment with ultrasound for a period of time of 15 minutes (this being done in order to accelerate the filling of the pores of the material) and then left immersed in the sulphuric acid solution for a period of time of 12 hours, this being done in order to optimize the filling of the pores by the sulphuric acid solution.

The carbon-based material impregnated with acid is subsequently placed in an oven under a stream of nitrogen at 0.15 subjected to a rise in temperature of 5° C./min, up to a plateau of 350° C., and then maintained at this temperature for a period of time of one hour.

II—XPS Analysis

The XPS analysis is carried out using a PHI Quantera SXM instrument having a monochromatic Al Kα source. The depth of analysis by the X-ray photons is less than 10 nm (approximately 3 nm) and the detection angle is at 45° with respect to the sample.

Figure 1:
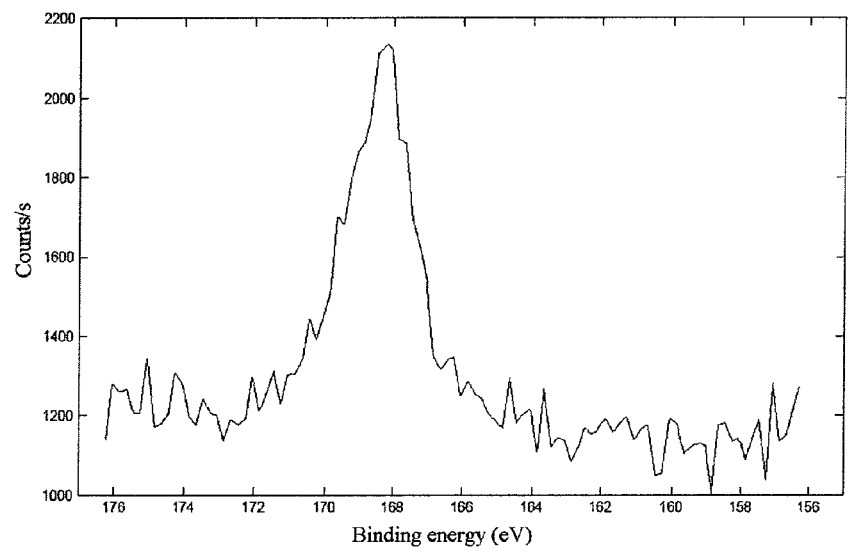
FIG. 1 represents an XPS analysis of a sulphur-modified porous carbon-based material corresponding to the definition of the invention (carbon-based material of Example 1)

This analysis shows a peak centred at approximately 169 eV, characteristic of sulphur in the oxidized form. FIG. 1 represents the region of the binding energy spectrum where the characteristic peak can be observed. The quantitative analysis indicates a sulphur content of 0.45%.

III—Measurements of the Pore Volume and of the BET Surface

The textural properties of the carbon-based materials (specific surface and pore volume) were analyzed by nitrogen adsorption manometry at 77K on a Micromeritics ASAP 2010 device. The specific surface of the carbon-based materials is deduced from the adsorption isotherm using the BET method (S. Brunauer et al., J. Am. Chem. Soc., 60 (1938), 309). The total pore volume is determined directly on the isotherm by converting the value of the volume adsorbed at P/P$^0$=0.95.

The values obtained are as follows:

Specific surface: $S_{spe}$=675±50 m$^2$·g$^{-1}$,

Pore volume: $V_{tot}$=0.54±0.06 cm$^3$·g$^{-1}$.

IV—Measurements of the Capacitances and Energy Densities

The capacitances of the sulphur-modified porous carbon-based materials were characterized in a three-electrode electrochemical device using a VMP3 potentiostat (Biologic) controlled by EC-lab software. The carbon-based materials were characterized in particular by chronopotentiometry using current densities ranging from 0.125 to 0.5 A/g of electrode.

The working electrode and the counterelectrode are composed of a sheet of monolithic carbon (of known weight and surface area) brought into contact with a platinum mesh acting as collector. The system is perfectly symmetrical. The reference electrode is short-circuited with the counterelectrode.

The capacitances were measured in two different aqueous electrolytes: a 1M sulphuric acid H$_2$SO$_4$ solution and a 6M potassium hydroxide KOH solution, these electrolytes being reference aqueous electrolytes in the fields of application targeted.

The overall capacitance of the system was measured in farads (F) from the charge/discharge curves using the following equation:

$$C=It/(V_1-V_2).$$

The mean specific capacitance of the carbon-based materials is deduced from the overall capacitance of the two electrodes in series, with respect to the weight of a carbon-based material filled with electrolyte.

The energy densities were measured in accordance with the protocol described in J. R. Miller and A. F. Burke, "Electric vehicle capacitor test procedure manual", 1994, DOE/ID10491, pp. 21-25.

V—Results

Measurements were also carried out on porous carbon-based materials not modified with sulphur, the said materials having been prepared according to the protocol described above but without post-treatment with sulphur or subsequent heat treatment (process comprising neither stage (iii) nor stage (iv)).

Chronopotentiograms were produced during a characterization in galvanostatic mode, the sample being subjected to a current and the potential response being observed. The carbon-based materials were, for this, subjected to charge/discharge cycles at 0.25 A/g in a two-electrode assembly.

Figure 2:
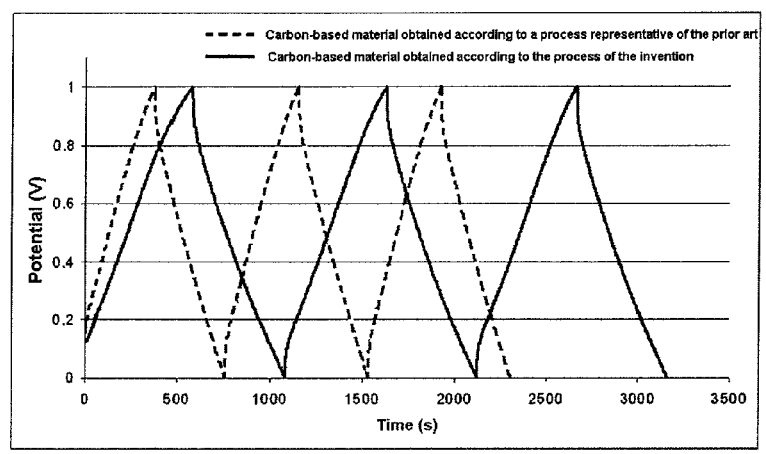
FIG. 2 represents chronopotentiograms obtained respectively for a carbon-based material prepared according to the process of the invention and for a carbon-based material obtained according to a process representative of the prior art.

The chronopotentiograms obtained with regard to a symmetrical system (1M H$_2$SO$_4$ electrolyte) for a carbon-based material prepared according to a process of the prior art and for a carbon-based material prepared according to a process of the invention demonstrate an increase in capacitance of 50% for the material obtained according to the process of the invention (see FIG. 2).

The results are summarized in Table 1 below:

TABLE 1

| Samples | Representative of the prior art | According to the process of the invention |
|---|---|---|
| Mean capacitance (in F/g of carbon filled with 1M H$_2$SO$_4$) (±5 F/g) | 75 | 140 |
| Energy density of the symmetrical system under load at 1.1 V (in Wh/kg of carbon filled with 1M H$_2$SO$_4$) | 2.95 | 6.0 |
| Mean capacitance (in F/g of carbon filled with 6M KOH) (±5 F/g) | 63 | 120 |
| Energy density of the symmetrical system under load at 1.1 V (in Wh/kg of carbon filled with 6M KOH) | 2.6 | 5.1 |

EXAMPLE 2

Counter-Example

I—Synthetic Protocol

Monolithic carbon-based materials are prepared using amounts identical to those used in Example 1 and applying different treatment conditions.

Two carbon-based materials C1 and C2 were thus prepared.

The material C1 is first subjected to a hydrogenation stage (a rise in temperature of 1° C./min up to 730° C. and then maintenance of this temperature for 5 hours).

The materials are subsequently placed in a solution of pure sulphuric acid, subjected to treatment with ultrasound for a period of time of 15 minutes (this being done in order to optimize the filling of the pores by the sulphuric acid solution) and left immersed in the sulphuric acid solution for a period of time of 12 hours.

Each carbon-based material impregnated with acid is subsequently placed in an oven under a stream of nitrogen, then subjected to a rise in temperature of 5° C./min up to a plateau of 125° C. and then maintained at this temperature for a period of time of 24 hours.

II—Measurements of the Sulphur Content

The sulphur contents were determined by XPS analysis, as described in Example 1.

The results are summarized in Table 2 below and are compared with the performance of the carbon-based material prepared according to the process of the invention (cf. Example 1).

III—Measurements of the Specific Surface and Pore Volume

The specific surface and the pore volume were determined according to the same protocol as that described in Example 1.

The samples exhibit the following specific surfaces and pore volumes:
Specific surface: $S_{spe}=675\pm50$ m$^2 \cdot$g$^{-1}$,
Pore volume: $V_{tot}=0.54\pm0.06$ cm$^3 \cdot$g$^{-1}$.

IV—Results

The sulphur contents, the full capacitances and the energy densities obtained for the carbon-based materials C1 and C2 are summarized in the following Table 2:

TABLE 2

| Samples | Material C1 | Material C2 | Carbon-based material of Example 1 |
|---|---|---|---|
| Treatment conditions | Hydrogenation at 730° C. and then treatment with an H$_2$SO$_4$ solution at 125° C. for 24 hours | Treatment with an H$_2$SO$_4$ solution at 125° C. for 24 hours | Treatment with an H$_2$SO$_4$ solution at 350° C. for 1 hour |
| Atomic % of sulphur | 1.0 | 0.55 | 0.45 |
| Mean capacitance (in F/g of carbon filled with 1M H$_2$SO$_4$) (±5 F/g) | 135 | 120 | 140 |
| Energy density of the symmetrical system under load at 1.1 V (in Wh/kg of carbon filled with 1M H$_2$SO$_4$) | 5.6 | 5.0 | 6.0 |

The comparison of the capacitances of the carbon-based materials C1 and C2 shows that, with a heat treatment at 125° C., a preliminary hydrogenation stage is necessary in order to maximize the capacitance performance. On the other hand, the mean capacitances measured remain lower than those of the carbon-based materials prepared according to the process of the invention.

Figure 3:
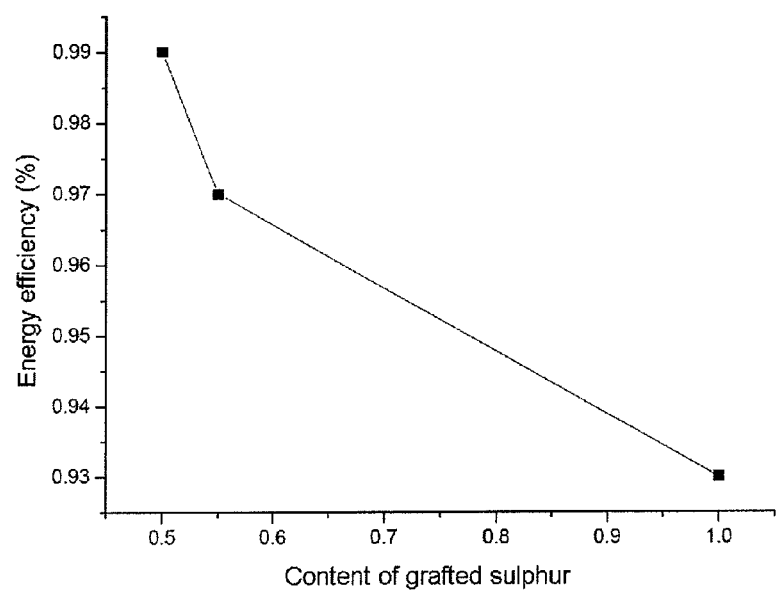
FIG. 3 represents the energy efficiency as a function of the content of sulphur grafted to the surface of the carbon-based materials, after a post-treatment with sulphur (carbon-based materials of Example 2).

FIG. 3 shows the energy efficiencies of the preceding carbon-based materials (C1, C2 and carbon-based material of Example 1) as a function of their content of grafted sulphur. It is observed that maximizing the sulphur content at the surface of the carbon-based materials (>0.5%) does not necessarily result in an increase in the performance since the energy efficiency decreases. Greater phenomena of self-discharge appear when the sulphur content increases (>0.5%): sulphur-based functional groups react spontaneously in the presence of electrolyte (interfering redox reactions), thus limiting the energy efficiency.

EXAMPLE 3

I—Synthetic Protocol

Two monolithic carbon-based materials are prepared according to the protocol of Example 1, the nature of the strong sulphur-based acid and the heat treatment temperature being modified: sulphuric acid and the heat treatment at 350° C. (for one hour) are replaced by a saturated (NH$_4$)$_2$SO$_4$ solution and a heat treatment at 235° C. (for 30 minutes) (conditions described in N. Lakshmi et al., J. Phys. D: Appl. Phys., 39 (2006), 2785-2790).

II—Measurements of the Specific Surface and Pore Volume

The specific surface and the pore volume were determined according to the same protocol as that described in Example 1.

The samples exhibit the following specific surfaces and pore volumes:
Specific surface: $S_{spe}=675\pm50$ m$^2 \cdot$g$^{-1}$,
Pore volume: $V_{tot}=0.54\pm0.06$ cm$^3 \cdot$g$^{-1}$.

III—Results

The results are summarized in Table 3 below:

TABLE 3

| Samples | Material representative of the prior art | Carbon-based material of Example 1 |
|---|---|---|
| Treatment conditions | Saturated (NH$_4$)$_2$SO$_4$, 235° C., 30 min | According to the process of the invention |
| Atomic % of sulphur | 4 | 0.45 |
| Mean capacitance (in F/g of carbon filled with 1M H$_2$SO$_4$) (±5 F/g) | 80 | 140 |

These results demonstrate than an increase in the sulphur content does not necessarily imply an increase in capacitance. On the contrary, it appears that the nature of the grafted sulphur-based functional groups also plays a role with regard to the improvement in the capacitance performance. In addition, it appears that the nature of the sulphur-based precursor is a determining factor in the effectiveness of the treatment, the use of a solution of strong sulphur-based acid having a pH<1 being recommended to improve the capacitance performances of the carbon-based materials.

The invention claimed is:

1. Process for the preparation of a sulphur-modified monolithic porous carbon-based material, comprising at least the following stages:
(i) drying of a gel comprising at least one hydrophilic polymer of polyhydroxybenzene/formaldehyde type,
(ii) pyrolysis of the material obtained during stage (i),
(iii) impregnation of the material resulting from stage (ii) with a strong sulphur-based acid,
(iv) heat treatment at a temperature of between 300 and 500° C., of the sulphur-modified material obtained at the end of stage (iii),
the said process not comprising a hydrogenation stage.

2. Process according to claim 1, wherein said gel additionally comprises at least one latex.

3. Process according to claim 2, wherein said latex is a nitrogen-based latex, preferably chosen from nitrile rubbers.

4. Process according to claim 1, wherein the stage (i) of drying is carried out either by exchange of solvents and then drying in a supercritical CO2 medium, or by convective drying under a gas stream or in a climate-controlled chamber at a controlled degree of humidity, or by lyophilization.

5. Process according to claim 1, wherein the stage (ii) of pyrolysis is carried out under a nitrogen atmosphere according to the following protocol:
   a slow rise in temperature, at a rate of between 1 and 5° C./min, up to a temperature of 400-500° C., it being possible for this temperature to be maintained for an approximate period of time of one hour, followed by
   a faster rise in temperature, at a rate of between 5 and 20° C./min, up to a temperature of 800-1500° C., it being possible for this temperature to be maintained for an approximate period of time of two hours.

6. Process according to claim 1, wherein the strong sulphur-based acid is an acid based on sulphur which is provided in the form of a solution of pH<1.

7. Process according to claim 1, wherein the strong sulphur-based acid is chosen from sulphuric acid, oleum, chlorosulphonic acid and fluorosulphonic acid.

8. Process according to claim 1, wherein the said strong sulphur-based acid is a sulphuric acid solution having a concentration of between 0.5M and saturation, and preferably between 1M and saturation.

9. Process according to claim 1, wherein the stage (iv) of heat treatment is carried out for a period of time of between 1 minute and 12 hours, and preferably of less than or equal to 2 hours.

\* \* \* \* \*

UNITED STATES PATENT AND TRADEMARK OFFICE
CERTIFICATE OF CORRECTION

PATENT NO.        : 8,778,230 B2                                         Page 1 of 1
APPLICATION NO.   : 13/294513
DATED             : July 15, 2014
INVENTOR(S)       : Ayme-Perrot et al.

It is certified that error appears in the above-identified patent and that said Letters Patent is hereby corrected as shown below:

<u>Title Page,</u>

Item (73) Assignee: "Hitchinson" should read --Hutchinson--.

Signed and Sealed this
Fourth Day of November, 2014

Michelle K. Lee
*Deputy Director of the United States Patent and Trademark Office*